(12) United States Patent
Elofson (10) Patent No.: US 7,235,792 B2
(45) Date of Patent: Jun. 26, 2007

(54) COLOR-TUNED VOLUMETRIC LIGHT USING HIGH QUANTUM YIELD NANOCRYSTALS

(76) Inventor: Carl Scott Elofson, 12020 Hebe Ave., Norwalk, CA (US) 90650

( * ) Notice: Subject to any disclaimer, the term of this patent is extended or adjusted under 35 U.S.C. 154(b) by 140 days.

(21) Appl. No.: 11/133,813

(22) Filed: May 19, 2005

(65) Prior Publication Data

US 2005/0279915 A1 Dec. 22, 2005

Related U.S. Application Data

(60) Provisional application No. 60/572,878, filed on May 19, 2004.

(51) Int. Cl.
*G01N 21/64* (2006.01)

(52) U.S. Cl. ............... 250/461.1; 250/216; 250/372; 250/504 R; 250/458.1; 250/205; 313/112; 362/84; 362/231; 362/260; 362/362

(58) Field of Classification Search ............ 250/205, 250/372, 216, 365, 458.1, 459.1, 461.1, 462.1, 250/504 R; 362/19, 230, 231, 235, 236, 362/257, 293, 313, 260, 362, 84; 313/112, 313/483, 523–525, 539
See application file for complete search history.

(56) References Cited

U.S. PATENT DOCUMENTS

| | | | |
|---|---|---|---|
| 865,367 A | 9/1907 | Edison | |
| 3,748,517 A | 7/1973 | Haft | 313/109 |
| 3,858,082 A | 12/1974 | Thornton, Jr. | 313/487 |
| 4,001,663 A | 1/1977 | Bray | 321/2 |
| 4,075,532 A | 2/1978 | Piper et al. | 313/497 |
| 4,127,322 A | 11/1978 | Jacobson et al. | 353/31 |
| 4,281,897 A | 8/1981 | Fletcher | 350/274 |
| 4,500,810 A | 2/1985 | Graff | 313/486 |
| 4,602,321 A | 7/1986 | Bornhorst | 362/268 |
| 4,647,812 A | 3/1987 | Vriens et al. | 313/474 |
| 4,822,144 A | 4/1989 | Vriens | 350/339 |
| 4,845,481 A | 7/1989 | Havel | 340/762 |
| 4,882,498 A | 11/1989 | Cochran et al. | 250/571 |
| 4,990,824 A | 2/1991 | Vriens et al. | 313/474 |
| 5,008,789 A * | 4/1991 | Arai et al. | 362/255 |
| 5,143,444 A | 9/1992 | Shields | 362/293 |
| 5,146,355 A | 9/1992 | Prince et al. | 359/50 |
| 5,287,096 A | 2/1994 | Thompson et al. | 345/147 |
| 5,306,445 A | 4/1994 | Reed et al. | 252/646 |
| 5,422,489 A | 6/1995 | Bhargava | 250/488 |
| 5,592,052 A | 1/1997 | Maya et al. | 315/291 |
| 5,813,752 A | 9/1998 | Singer et al. | 362/293 |
| 6,016,038 A | 1/2000 | Mueller et al. | 315/291 |
| 6,072,276 A * | 6/2000 | Okajima | 313/581 |
| 6,084,250 A | 7/2000 | Justel et al. | 257/89 |
| 6,155,699 A | 12/2000 | Miller et al. | 362/293 |
| 6,379,635 B2 | 4/2002 | O'Brien et al. | 423/87 |
| 6,454,440 B2 | 9/2002 | Yamamoto | 362/293 |
| 6,501,091 B1 | 12/2002 | Bawendi et al. | 257/14 |
| 6,602,758 B2 | 8/2003 | Kizilyalli et al. | 438/424 |
| 6,623,144 B2 | 9/2003 | Bornhorst | 362/318 |
| 6,734,465 B1 | 5/2004 | Taskar et al. | 257/80 |
| 6,869,545 B2 | 3/2005 | Peng et al. | 252/301 |
| 6,967,116 B2 | 11/2005 | Negley | 438/22 |
| 6,994,453 B2 | 2/2006 | Blanchard | 362/293 |
| 7,008,071 B2 * | 3/2006 | Buelow et al. | 362/84 |
| 7,042,020 B2 | 5/2006 | Negley | 257/98 |

* cited by examiner

(Continued)

*Primary Examiner*—Georgia Epps
*Assistant Examiner*—Francis M. LeGasse, Jr.
(74) *Attorney, Agent, or Firm*—Drummond & Duckworth (57) ABSTRACT

A light source of coaxially stacked volumetric light cells that can be used either in a lamp or a display. Each light cell is composed of high quantum yield nanocrystals in a silica aerogel matrix that is excited by a controlled ultraviolet light source. From these stacked cell assemblies visible light is emitted of a desired color or color temperature and brightness.

14 Claims, 10 Drawing Sheets

COLOR-TUNED VOLUMETRIC LIGHT USING HIGH QUANTUM YIELD NANOCRYSTALS

PRIORITY RELATED U.S. APPLICATION DATA

This application claims priority to U.S. provisional application Ser. No. 60/572,878, filed May 19, 2004.

TECHNICAL FIELD OF THE INVENTION

The field of the invention is lighting and displays whose spectral density and brightness is adjustable.

BACKGROUND OF THE INVENTION

There are many sources of artificial lighting, from the very old arc and incandescent lamps, the middle-aged fluorescent lamps, to the new-aged laser and solid state lamps. While each of the these lamps may be suitable for many uses and application, none is very good for many uses. Carbon arcs are becoming almost non-existent, incandescent use is dropping, fluorescent is gaining, and solid state growing very fast. Even with all of this change we have not achieved a revolution in lighting. Incandescent lamps are good at one brightness, but they cannot be dimmed without radically changing color temperature. Most fluorescent lights have poor color rendering and with most white LEDs color rendering is no better. What is needed is a lamp whose color and/or color temperature is tunable in power spectral density and brightness.

Lamps using this advance in the state of art would have many uses from the scientific, medical, personal, and studio lights for film or video production, or for entertainment. These lamps, if put into arrays, could be used for lighting panels.

Large arrays of these lamps might be used for video displays in theaters or for outdoor displays. They can be used anywhere a repeatable controlled variable color or color temperature light is needed.

The most basic lamp is composed of a cell containing one phosphor in a supporting matrix that is illuminated by an exciting energy, in this case, ultraviolet (UV) light. The outer edges of the device are surrounded by a UV light source and this light source is covered by a housing which keeps the UV light in, and external light out. When the UV source is on it causes the phosphors in the matrix to fluoresce. Units so comprised would give a fixes spectral output, of that one phosphor. Furthermore its intensity (brightness) would also be fixed if the UV illumination level was fixed, thus it is not tunable. A lamp unit designed like this would be very similar to the volumetric light source described in U.S. Pat. No. 5,306,445 which is herein incorporated by reference. Reed, et al., U.S. Pat. No. 5,306,445 "Inorganic volumetric light source excited by ultraviolet light" is the keystone patent to this disclosure. Without the methods taught within it, the new embodiments disclosed here would not be possible. reed, et al. used—and I will also use—silica aerogel as support matrix for the Q-particle phosphors. If it were not for recent advances in research, and in the art of the manufacturing of Q-particle phosphors, now commonly called quantum dots, this advance would not be possible.

The preferred phosphors are t hose whose spectral curve is almost gaussian and have a half width at half maximum (hwhm) bandwidths of around 20-30 nm, cover the full visible spectrum, and are composed of cadmium sulfide or cadmium selenide. With careful selection and blending one can make up almost any visible power spectrum one wants. These nanocrystalline materials go by many names: nanoparticles, Q-particles, quantum dots, quantum nanodots, or nanocrystallites. There are two researchers who have companies that sell quantum dots that have utility: Nanoco, 48 Grafton Street, Manchester M13 9XX, UK and Paul O'Brien was issued the U.S. Pat. No. 6,379,635, which is herein incorporated by reference, for a "Process for preparing a nanocrystalline material." The other is Nanomaterials and Nanofabrication Laboratories (NN-Labs) PO Box 2168/and Peng, et al. was issued a U.S. Pat. No. 6,869,545, which is herein incorporated by reference.

The first electrical fluorescent lamp patent was granted to Edison in 1907, U.S. Pat. No. 865,367, and is used x-rays to energize a phosphor. Since then many fluorescent lamps have been disclosed which advanced the art, but the color rendering from these lights was poor, and the search was on for a lamp with a high-color rendering index(CRI). That changed with the development of three-bank fluorescent lamps using UV light from the excitation of mercury vapor. The phosphors employed in these lamps have three different spectral distributions and the perceived color each distribution colors would be red, green, and blue. Among the first U.S. patents issued that advanced the art in this direction are: U.S. Pat. No. 3,748,517 issued to Haft in 1973 and U.S. Pat. No. 3,858,082 issued to Thornton in 1974. The art of fluorescent lamps was advanced again in U.S. Pat. No. 4,075,532. It was issued to Piper in 1987 and it demonstrates a two-band fluorescent lamp using phosphors that have a narrow "blue" emission spectrum, and a broad "yellow" emission spectrum to give white light. The art of a two-band fluorescent lamp was developed giving a less expensive bulb but poorer color rendering than the three-band bulbs, but better than a conventional one. U.S. Pat. No. 3,602,758 was issued to Thornton in 1971 and it illustrates a method for making a two-phosphor layer fluorescent lamp. This is achieved by coating a substrate with one layer of phosphors of one type, and putting another layer of different phosphors on top of that. UV light from a mercury discharge illuminates the first layer causing that layer to fluoresce and subsequently through the second causing that layer to fluoresce also and exit the lamp. By using this method, it enables the spectral power emissions of the two phosphors to be summed, giving a spectral power curve that neither alone could give. This method increased the efficiency of the phosphors, but color rendering was not very good. Hybrids of this process and the three-band method made a higher CRI bulb that is cheaper than a pure three-band bulb.

All of the fluorescent mercury discharge lamps mentioned above use one or more of the following types of phosphors: halophosphate phosphors, phosphate phosphors, silicate phosphors, aluminate phosphors, or tungstate phosphors. These phosphors have properties that allow them to work well in the environment of a mercury discharge arc. Most of these phosphors have multiple peaks or wider spectral bandwidth than phosphors used in cathode ray tubes.

U.S. Pat. No. 5,592,052 was issued to Maya in 1997 for a "Variable color temperature fluorescent lamp" and it teaches a method of making a fluorescent lamp having at least two phosphor coatings on the surface of the sealed lamp bulb. there is variable driving means which preferentially activates one phosphor and not the other phosphors. This allows the user to change the color temperature of the lamp by controlling parameters of the electrical driving signal, thus changing the light output to be more or less blue or red, or to balance the longer wavelengths perceived against the shorter wavelengths perceived. A real advance in the art was made by this patent: it is able to shift its color temperature by an electronic control unit. However, the color rendering in not as high as the more advanced three-band fluorescent lamps.

Florescent lamps have developed greatly over the years but there is no lamp that has a very high CRI and that is variable in color, temperature and brightness. Cathode ray tubes (CRTs) use different types of phosphors than conventional fluorescent lights. A CRTs CRT's phosphor functions by a electron beam, in vacuum, hitting a phosphor layer on a coated transparent substrate. Black and white CRTs that are used for television are composed of a mixture of blue and yellow phosphors to give a "white" light. The typical compositions for the blue emitter is a silver-activated zinc sulfide and the yellow emitter is silver-activated zinc-cadmium sulfide. Color CRTs use red green and blue phosphors and the composition of the typical phosphors are: for red in old pre-1966 tubes was gold-activated zinc-cadmium sulfide and common currently is an europium-activated yttrium oxysulfide; for green it is a copper-aluminum-activated zinc sulfide; for blue it is a gold-activated zinc sulfide. These phosphors have to work in the environment of a vacuum and in the presence of an electron beam. These phosphors have a relatively narrow spectral band width and are typically metal sulfides.

The difference between the phosphors for displays and lights is quite great. With displays you want a narrow bandwidth so you can more accurately portray saturated colors. With displays you are not trying to make a white light with a high CRI because you are not interested in the reflected light, but transmitted light. With lights, for illumination, the goal is to make a lamp that will render the environment accurately and not have problems with metamerism, and you are dealing with reflected light.

The colors of two objects are generally designated as being metameric if these objects have a different reflection spectrum, but nevertheless give the same color impression under a given kind of light, for example in daylight. Then if under another kind of light, for example an incandescent lamp, the color impression of these objects is different. This improved embodiment of a fluorescent lamp that I have developed overcomes many of these problems of color rendering and metamerism by having the ability to change the spectral power curve (color temperature) and/or brightness. A lot of lamps are good at color rendering but only at one brightness; others can be dimmed but have color rendering problems at different brightnesses.

There are many process that have been used in prior art in varying the power output of lamps: (1) by physical some methods using some sort of shutter that chops the light or partially obscures the lamps source: U.S. Pat. No. 4,281,897; by optical methods optically variable or transmissive or reflective filters: U.S. Pat. No. 4,127,322, U.S. Pat. No. 5,287,096; (2) by electronic methods that are analogous the physical and optical methods; (3) by Pulse Width Modulation (PWM) which is analogous to a variable physical light chopping shutter. The power source is either on or off and the ratio on to off determines the power output. To use PWM with light-emitting diodes (LEDs) one must use current limiting in order to operate the devices with a margin of safety: U.S. Pat. No. 4,001,663; (4) by controlling the parameters of the voltage and/or current flowing through the device. Some precautions must be taken when using LEDs because they can be destroyed by passing too much current through them; and (5) by having a plurality of lamps wired in parallel that can be switched on or off independently. Thus the optical power output is the sum of the lights that are turned on.

What I will use to power and control the lamps are devices like Silicon Laboratories programmable digital power controllers which provide closed-loop feedback control, system protection, and power management functions for switch mode power systems. The Si825x architecture combines a dedicated DSP-based control loop processor with an in-system programmable system management processor. With these smart power supplies the power output of each light can be programmed.

The teaching about a variable color RGB LED display is in U.S. Pat. No. 4,845,481 issued to Have in 1989 "Continuosly variable color display device." He made the device to control the color on a readout display and this was accomplished by a PCM of power to and RGB LED display. Another teachings about a variable color RGB LED light unit is in U.S. Pat. No. 6,016,038 issued to Mueller, et al. in 2000 "Multicolored LED lighting method and apparatus", the PWM method of controlling the power to the LEDs which may be computer controlled. The problem with these LED lamps is that they are not very good at illumination. The bandwidth of the R, G. B, source LED is too narrow to give a good color rendering, but it works very well if you want saturated colored light. The possible amount of colors is limited to the areas within the CIE triangle. The advantages of lamps that use LED is that they have a long life and are quite efficient, and therefore do not produce a lot of heat.

Other methods of lighting have been developed to give very high illumination with variable color and brightness. These systems have the same color space problems because they are using the three primaries: red, green, and blue.

A remote-controlled high-brightness projection using RGB tricolor mixing, but it uses conventional optics. The teaching about it is in U.S. Pat. No. 4,602,321 issued to Bornhorst in 1986 "Light source having automatically variable hue, saturation and beam divergence."

Computerized high brightness projection and/or lighting systems using RGB tricolor mixing have developed recently: Constructed with conventional optics: U.S. Pat. No. 5,143,444 issued to Shields in 1992 "Computer controlled light with continuously variable color temperature, color, magnification, focus, and position." Constructed with digital micromirror device (DMD), U.S. Pat. No. 6,454,440 issued to Yamamoto in 2002 "Illumination apparatus and projection type display apparatus using the same." Constructed with LCD light gates: U.S. Pat. No. 6,623,144 issued to Bornhorst in 2003 "High intensity lighting projectors."

SUMMARY OF THE INVENTION

The present invention provides a system and methods for a tunable light source comprising a phosphor in an aerogel matrix that is excited by ultraviolet (UV) light. These lamp units can provide substantially any desired color temperature or power spectral density, and the unit can be operated in a stable mode or can be dynamically re-tuned as needed. These aerogel phosphor lamp units can be configured to give many different kinds of spectral distributions. They can be useful for general illumination needs and uses or they can be tailored for special uses Some designs will work best when they are used in displays; others are better for illumination uses.

Preferred embodiments of the present invention are contemplated to be especially useful in providing desired lighting for movie and television filming and recording. For example, particular embodiments can be used to provide the differences in lighting between actual and desired lighting. These differences can be calculated by subtracting the measured actual lighting from the known desired lighting, or by trial and error. In this manner, the present invention can be used to provide optimal brightness, color balance and/or lighting temperature for a given scene. Repeatability in lighting is very important for special effects where a scene may have to be re-shot later because something was not correctly matched.

Another preferred embodiment is using the aerogel phosphor lamp units in displays. A display would be made up of a grid of these lamp units. If you were making a normal display you would use red, green, and blue phosphors, but you could use more lamps units with other phosphors and make hyperspectral display and which would provide superior color rendering. Embodiments of the present invention can also be used to provide desired lighting for application of cosmetics, determining and applying hair coloring, and the like. As those skilled in the art will appreciate, brightness, color balance and/or lighting temperature greatly affect how cosmetics, hair coloring, and the like are perceived. By accurately mimicking desired lighting conditions, i.e., sunlight, incandescent lighting, etc., then cosmetics, hair coloring and the like can be viewed as they would be seen under these conditions. Further, using the present invention, cosmetic, hair coloring, and the like can be viewed under those lighting conditions that best show their desired effects.

Other applications of the present invention can be used to enhance visible light medical observation and imaging techniques. Various types of tissue have different appearances under different lighting conditions. For example, a particular tumor can be easier to see, either directly or after being imaged, when illuminated with a particular light intensity, color balance and/or temperature. More green light may, for example, make a particular tissue stand out better with respect to surrounding tissue.

Colors that have the same visual appearance (that is, the same tristimulus values), but have different spectral composition, are referred to as being metameric with respect to one another. This visual illusion is caused, to some extent, by ambient lighting. Therefore, the metameric effect can be controlled, to some extent, by controlling the ambient lighting. Thus, the present invention can be used to either decrease the incidence of metamers or to increase their incidence, as desired.

In still another applications of the present invention, the color content of the output of the present invention can be precisely controlled, making it possible to provide light having a desired power spectral density (PSD). Further, it is possible to step through desired frequencies, in a fashion similar to sine sweep, or in any other desired fashion, so as to provide a desired sequence of consecutive frequencies.

DETAILED DESCRIPTION OF THE INVENTION

A single tunable light source device is described in this disclosure, hence will be referred to as a lamp unit. The art is advanced with a lamp unit composed of two or more light cells and a separate UV illuminator for each light cell. Each light cell is a device that contains a phosphor or a mixture of different phosphors with different properties in a support matrix. Hereafter 'phosphor' will indicate a single phosphor or a mix of different phosphors. When the light cell is illuminated with UV light it causes the contents of the light cell to fluoresce emitting visible light from the phosphors when then exits the light cell.

The preferred support matrix, in this embodiment, is silica aerogel, but it could be any material that is capable of supporting a dispersion of phosphors and which is also UV and visible light transmissive. Some of the possible materials that meet these requirements are acrylic plastics and water.

Figure 1:
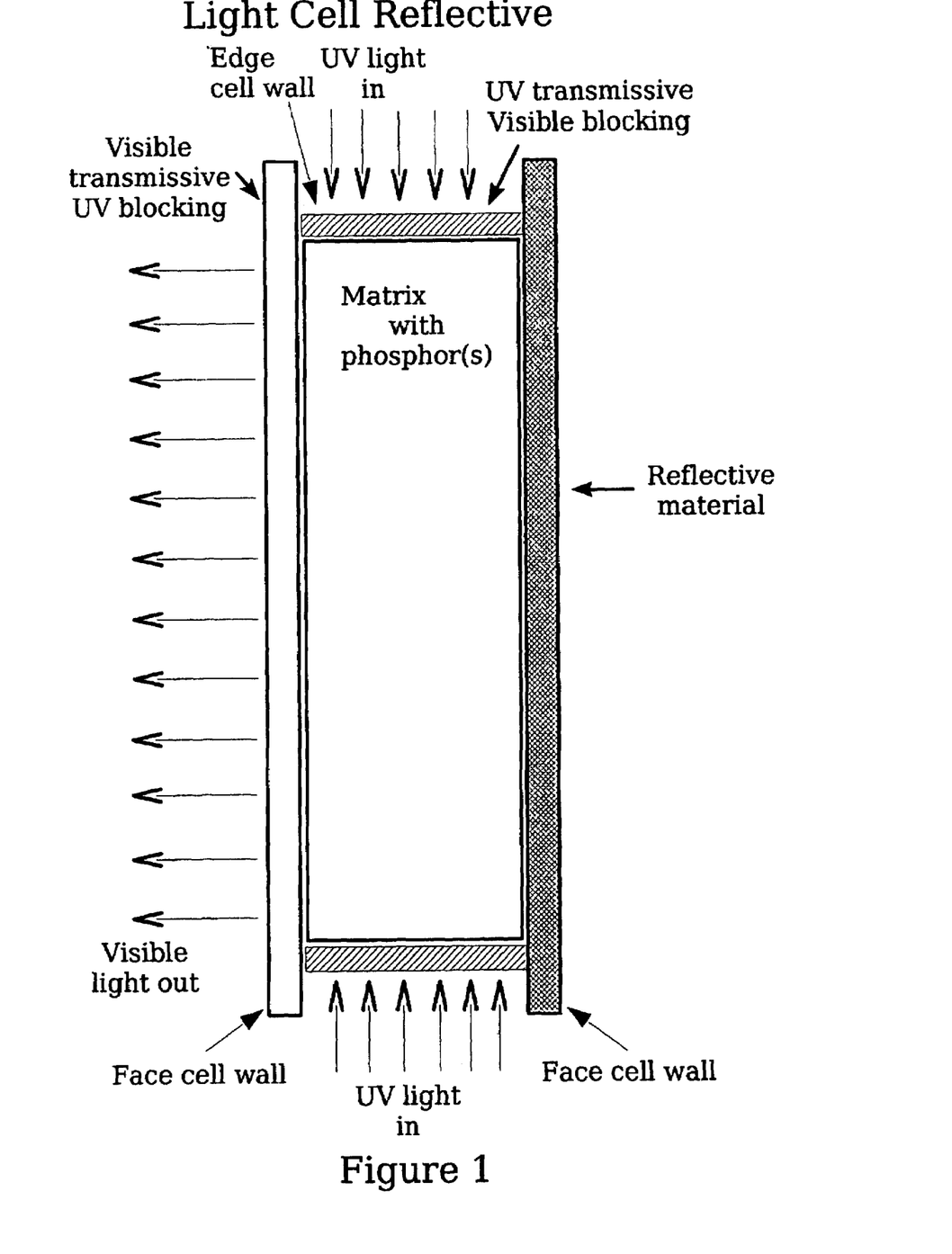
FIG. 1 is a side view of a first "reflective" light cell with reflective material for use with the controllable illumination device of the present invention.

A component cell of this lamp is composed of a container whose outer edge sides are transmissive to UV and the face sides are transmissive to visible light, and not transmissive to UV. But the preferred embodiment is to have the outer edge sides of the cell be transmissive to UV and be reflective to the visible spectrum. If this is done it will cut down on the stray light loss through the cell's outer edge sides into the outer area, of the lamp unit, where the light source resides. A light cell is a component cell that is filled with a phosphor in a support matrix. The light cells are of two basic types:

1) In the first type the face cell wall is composed of a filter that is transmissive of the visible spectrum and blocks UV light and the opposing face cell wall is composed of a reflective surface (mirror). (FIG. 1)

Figure 2:
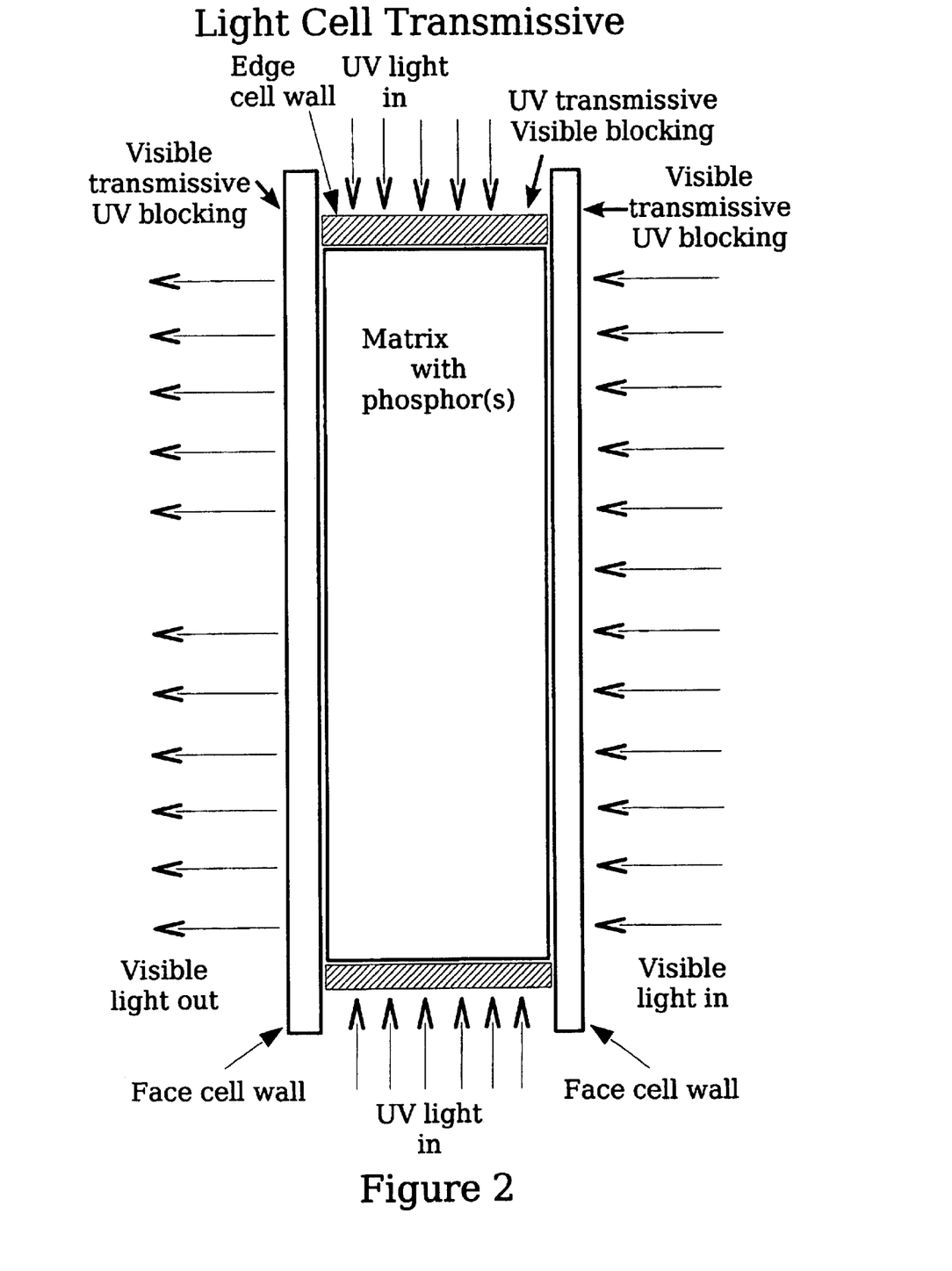
FIG. 2 is a side view of a second "transmissive" light cell for use with the controllable illumination device of the present invention.

2) In the second type the cell is the same except that the reflective plate is replaced with a filter. The filter could be the same as its opposing filter or one with different characteristics, but they both block UV light and pass all or part of the of the visible spectrum. Therefore this type of light cell has two visible light-transmissive face cell walls. (FIG. 2)

Figure 3:
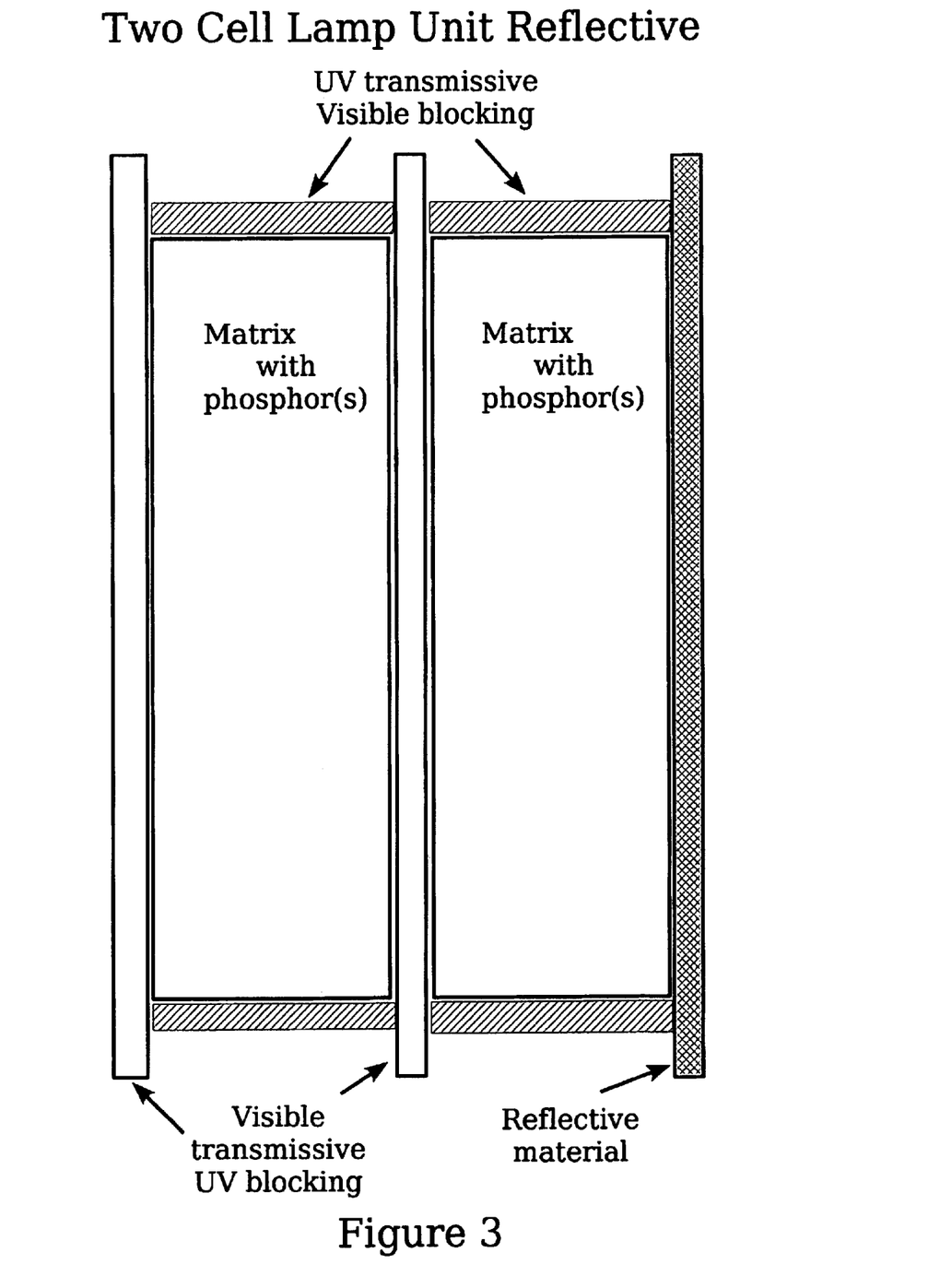
FIG. 3 is a side view of the first and second light cells shown in FIGS. 1 and 2 to produce an embodiment of the controllable illumination device of the present invention.

The improvement to the art is made when you have an assembly of two or more light cells and each cell with different phosphors, or mixtures of phosphors in each of the cells that comprise a lamp unit. These light cells are assembled by stacking them coaxially, that is they are aligned so that one fits on top of another in order to make a lamp unit. Each light cell has its own UV light source that is optically isolated from any other cell. (FIG. 3) The optical power output, of each UV light source, may be variable independently, thus each light cell will emit a variable amount of light. In this way the total light output will be the sum of the power spectral densities of the light emitted from the stack of light cells minus the losses from the light being transmitted through those cells and filters. Also the light emitted from a light cell is diffuse and the light emitted is not a point source like a laser, a lamp filament, many arc lights, or LED semiconductor chips. The light emitted is use diffused for two reasons: 1) the phosphors are evenly distributed, in the support matrix, thus photons are emitted from the whole volume of the matrix; and 2) dispersion is also caused by the matrix and phosphors in the matrix. The UV light that is used to drive these cells can be derived from many sources: LEDs, mercury arc lamps, mercury-xenon arc lamps, xenon arc lamps, deuterium arc lamps, metal-halide arc lamps, excimer discharge lamps, and tungsten-halogen incandescent lamps. The preferred embodiment uses UV LEDs because they have a relatively long life, do not generate a lot of heat, use low voltage direct current, have relatively narrow bandwidth, and are small in size compared to the other light sources. Excimer discharge lamps would also be a good choice because they are high power and have a narrow spectral distribution, and they can be fairly small, but they are very expensive and driving circuitry for them is more complicated. There are many processes that have been used in prior art in varying the power output of lamps:

1) by physical methods, using some sort of shutter that chops the light or partially obscures the lamp's source; 2) by optical methods—optically variable or transmissive or reflective filters: 3) by electronic methods that are analogous to the physical and optical methods: 4) by Pulse Width Modulation (PWM) which is analogous to a variable physical light chopping shutter. The power source is either on or off and the ratio on to off determines the power output: 5) by controlling the parameters of the voltage and/or current flowing through the device.

Some precautions must be taken when using LEDs because they can be destroyed by passing too much current through them. Because of this one must set an upper current limit that the device can take. To use PWM with LEDs one must use current-limiting in order to operate the devices with a margin of safety.

There is another way of varying the power to a lamp cell, switched additive (SA) method. This method is accomplished by turning on and off differing numbers of lamps surrounding and illuminating the lamp cell. Therefore, with n lamps, 0 to n lamps could be on. The power output would be the sum of powers of the individual lamps that are turned on. If LEDs are used you need to use a method if current limiting. If this method employs adjustable current limiting, then the power output of LEDs can be matched to give a linear or other power functions.

The SA method has advantages and disadvantages over the PWM method. In the individually switched design (SA) the advantage is that the light source is continuous, in that lights are only turning on or off when a parameter of light unit is changed.

Another disadvantage in the SA design is if one lamp fails you will only lose the power from that one lamp. A disadvantage of the SA design is that it is inherently parallel in that each lamp needs a separate controlled power line. Another disadvantage of the SA method is that the spatial distribution of the light in the light cell will diffuse, but not evenly, because only part of the lamps will be on at any one time. But with PWM if the light cell is emitting any power at all, then all the individual lamps are emitting some light.

A problem with the PWM method is that lamps are in sets of serial strings: if one LED fails in that string then the whole ensemble of LEDs will fail. A further problem with the PWM method is that the light from the lamps will always be strobing. The strobing can be minimized by adding circuitry that filters the power, but this method has it drawbacks in that it causes the voltage to be integrated, thus dropping the voltage across the device and therefore lowering the current flowing to the LED, in turn causing an unintended change in brightness.

The switched lamp method and PWM offer tradeoffs in performance. If you do not want flicker and want higher reliability, the switched lamp method is better. If you want a simpler implementation, the PWM is better, but you have to tolerate the strobing and lowered reliability.

Figure 4:
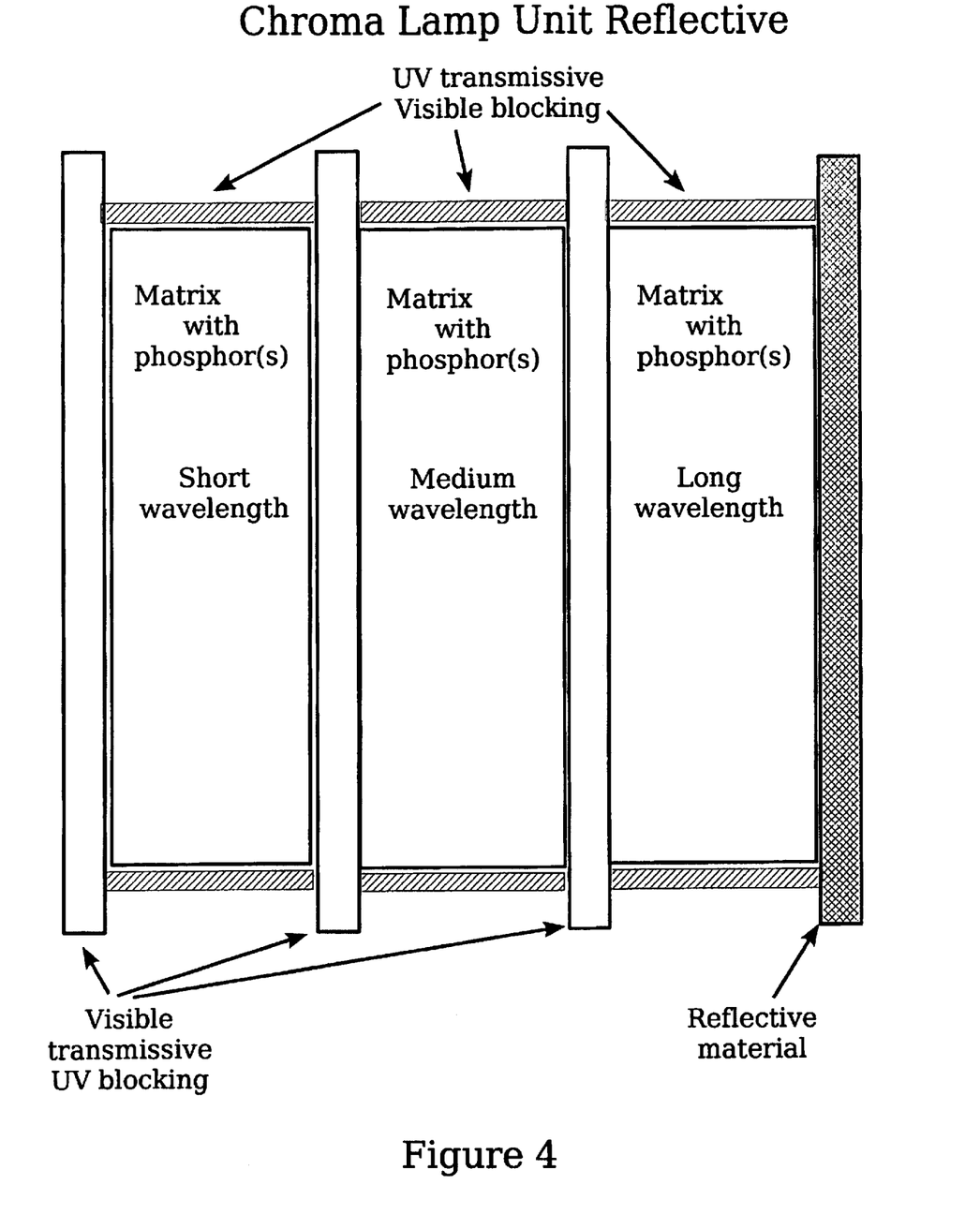
FIG. 4 is a side view of an additional embodiment of the controllable illumination device of the present invention including three cells.

An advance in the state of the art can be made to the second cell type described above. If the lamp unit is constructed from a stack of light cells that are sequentially spaced by decreasing phosphor wavelengths, it would be advantages advantageous to use different face cell filters with different bandpass and reflective characteristics. (FIG. 4) By using this method emitted visible light losses can be reduced because of decreased stray light losses and other losses that are caused by the phosphors being energized by shorter wavelength photons and readmitting photons of a longer wavelength. If this happens, it will cause an undesirable shift of the spectral output toward the longer wavelengths. The preferred use for a lamp unit constructed this way, is for generating light that is highly saturated (colored) and this design is not optimal for generating "white" light.

The lamp units described above are chroma lamp units. The light cells made this way are chroma light cells and are assembled into chroma lamp units. This method is not optimal for generating "white light" because it uses a limited number of phosphor bandwidths. With a two light cells, with narrow bandwidth phosphors, it is possible to simulate "white light" over a very narrow range, of color temperatures and the corresponding color rendering index (CRI) is inferior. By using narrow bandwidth phosphors with three light cells, the tuning or the "white" light color temperature range is higher and the CRI quite good (such as three cells with R, G. B). But as one increases the number of cell lights, in a lamp, the CRI increases respectively. Also with each addition of a cell light with different phosphor the better the color range will be.

Figure 5:
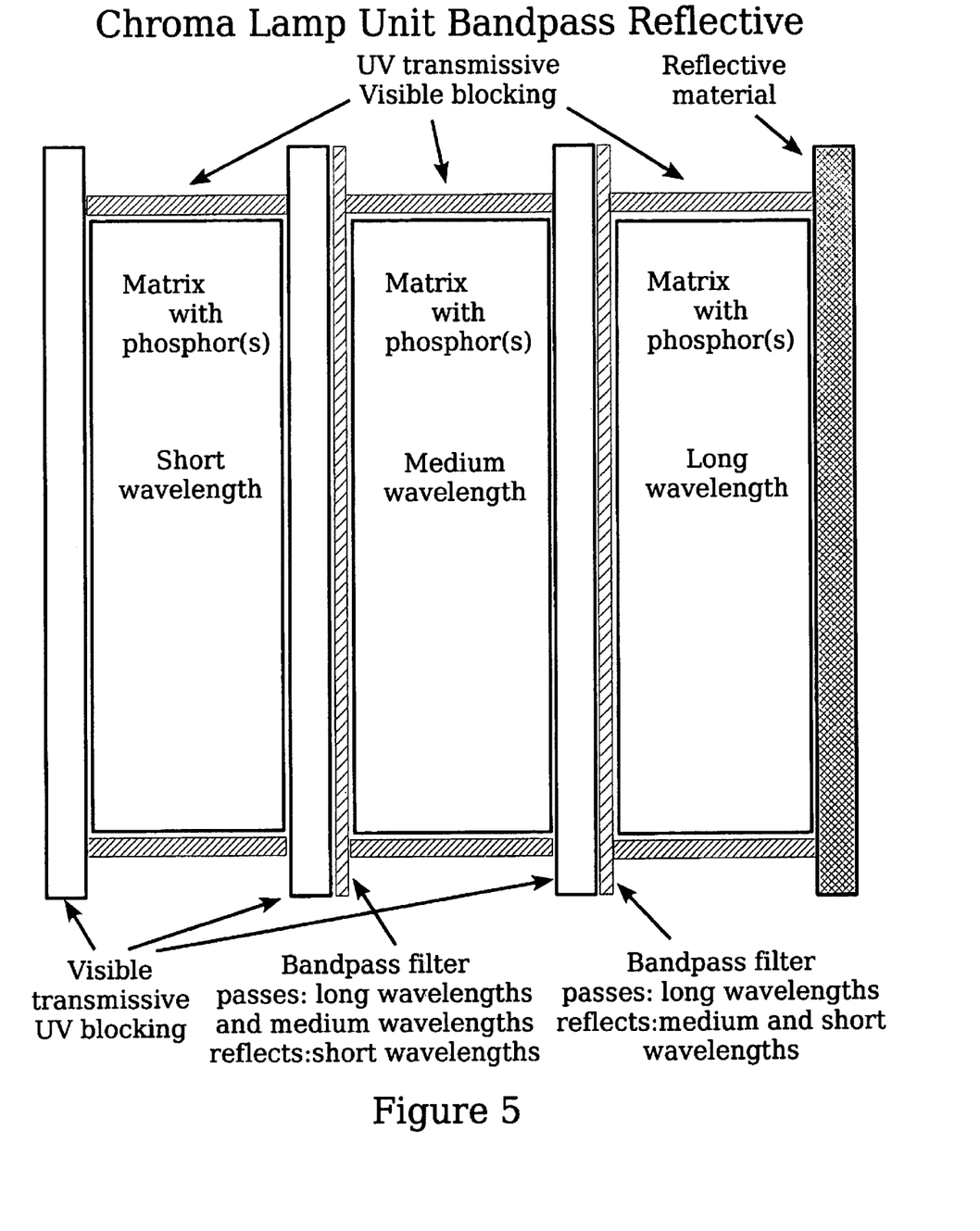
FIG. 5 is a side view of still an additional embodiment of the controllable illumination device of the present invention including three cells.

An improved embodiment of a chroma lamp unit discussed in the preceding paragraph would be: a stack of cells with the first cell having the mirrored side facing out and the cavity in the cell body would contain a long wavelength phosphor or phosphor mix and the first cell would be sealed with a bandpass filter that passes only the long wavelengths, of that phosphor mix, while reflecting the wavelengths shorter than the fluorescence of the phosphors. The next cell would be filled with phosphors that that are of a shorter wavelength and that cell would have a filter designed to pass the first wavelength and current wavelength of the phosphors in the cell. This process should be repeated until you reached the last phosphor with the shortest wave length and the terminal filter on the outside would filter out UV and pass the sum total of all the bandwidths of the phosphors in the lamp.(FIG 5)

Figure 6:
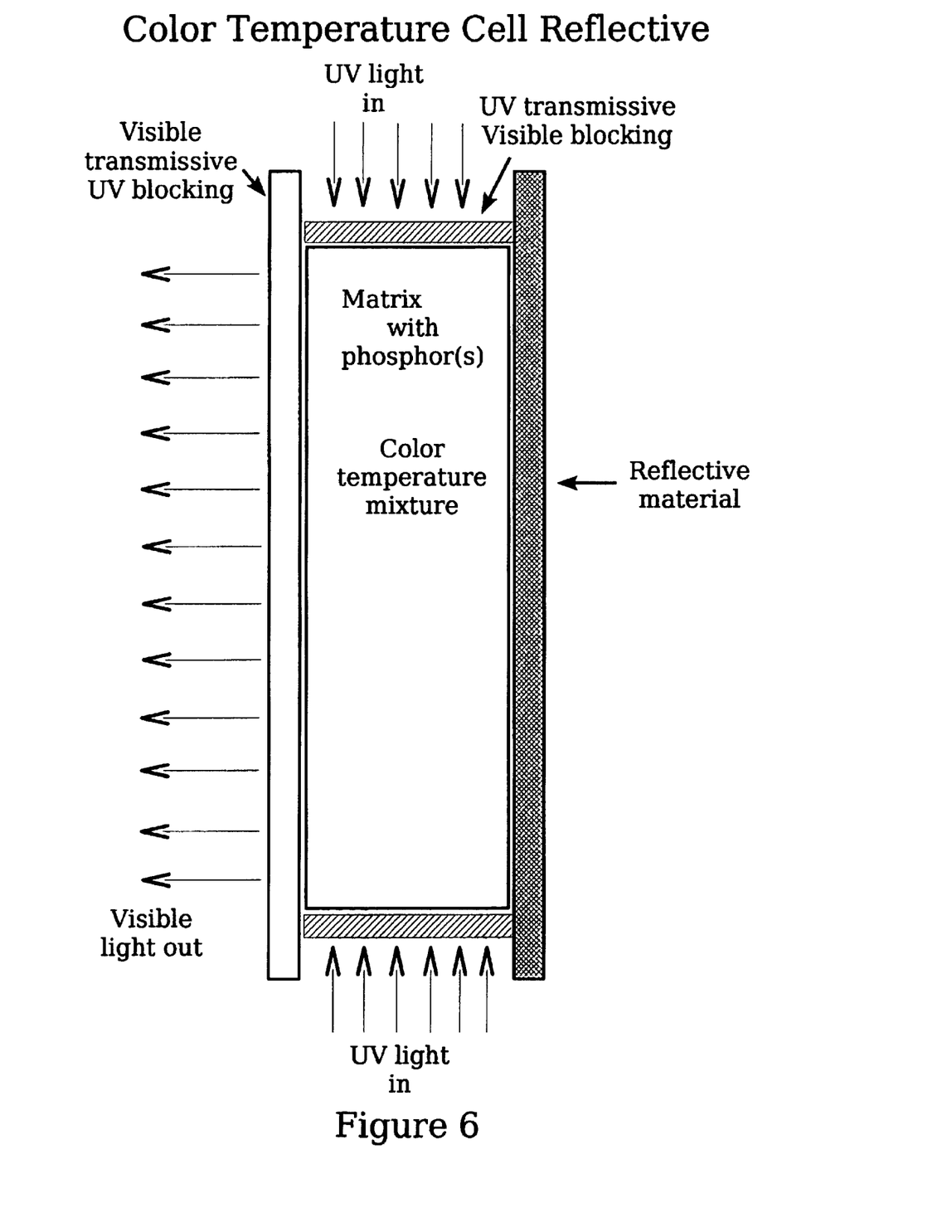
FIG. 6 is a side view of a first light cell with reflective material incorporating a color temperature mixture for use with the controllable illumination device of the present invention.
Figure 7:
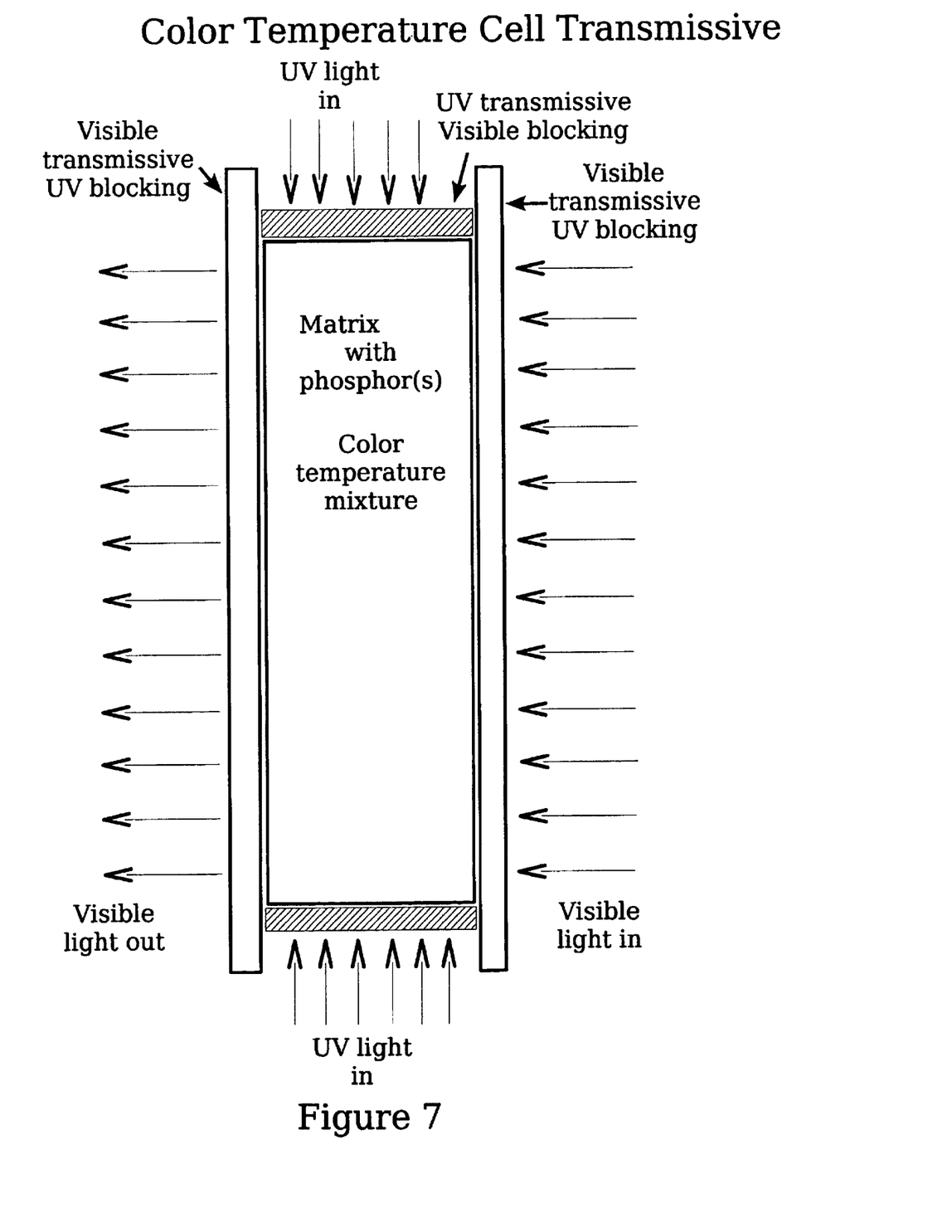
FIG. 7 is a side view of a second light cell incorporating a color temperature mixture for use with the controllable illumination device of the present invention.

Another lamp embodiment is one that simulates "white" light. This can be achieved by selecting the correct phosphor mix for a light cell. This is done by generating a Planckian blackbody spectral power curve for a given color temperature and selecting a mix of phosphors whose sum of spectral power curves that come close to that blackbody temperature spectral density curve. If this composed mixture of phosphors emitted spectra matches the calculated blackbody temperature spectra, then you will have a good simulation of that color temperature. If that mixture is put into a light cell and configured as the lamp unit it will be a light source for that color temperature. But a lamp constructed like this has a fixed color temperature and can only vary in brightness. The lamp unit described here is a color temperature lamp unit. The light cells made this way are color temperature light cells and are assembled into color temperature lamp units. There are two types of color temperature cells: reflective (FIG. 6) and transmissive. (FIG. 7)

Figure 8:
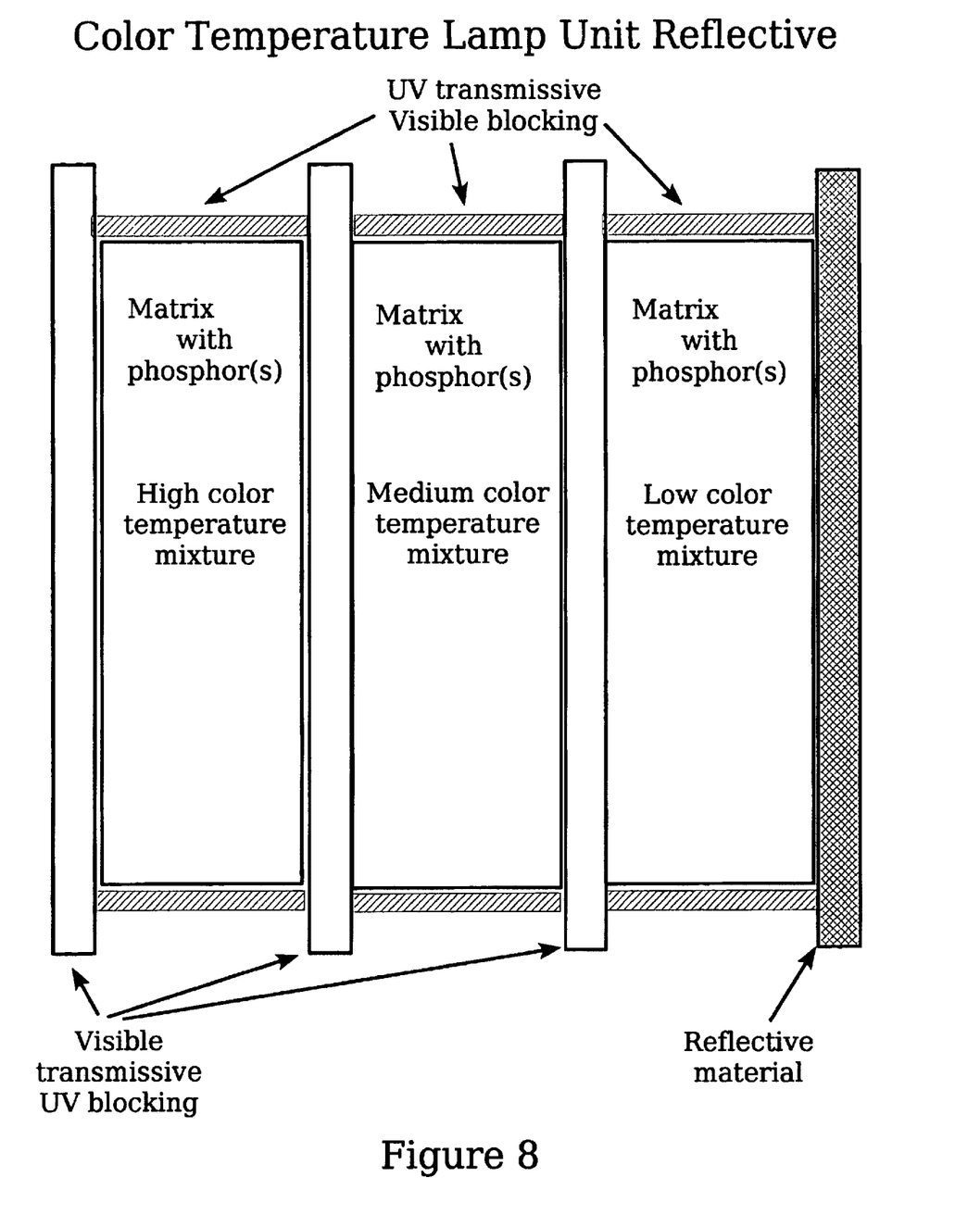
FIG. 8 is a side view of an additional embodiment of the controllable illumination device of the present invention including three cells incorporating high, medium and low color temperature mixtures.

A lamp embodiment that advances the state of the art is a color temperature lamp unit that uses two or more color temperature light cells. The simplest design uses two cells, a reflective cell light and transmissive cell light. In the first reflective light cell is a mixture of phosphors of a lower color temperature and in the other cell, the transmissive one, is a mixture of phosphors that has a lighter color temperature. By varying the power ratio between the two cells one can shift the color temperature between the low color temperature and the high color temperature. All of the transmissive face cell wall filters used in this embodiment are full bandwidth that pass the full visual spectrum. (FIG. 8)

A method that is somewhat similar to the two color temperature light cell embodiment is system described in U.S. Pat. No. 5,592,052 that uses a method to varying power to two different "white" phosphors on a common substrate. This is accomplished by changing the moving spectral power ratio of two UV emitting sources thus giving a color temperature shifted between two phosphors.

With more light cells of different color temperatures one can shift the color temperature with more precision. To make the lamp unit more efficient the cell lights spectral power curves will diverge from blackbody curve for each light cell. In a three-light cell lamp the phosphor mixture for the cell highest color temperature will be shifted toward the shorter wavelengths. While the middle color temperature light cell phosphor mixture will be basically the same and the low color temperature light cell will be shifted toward the longer wavelengths. Using this method the sum of the power delivered, to each of the light cells, for a given color temperature can be maximized.

Figure 9:
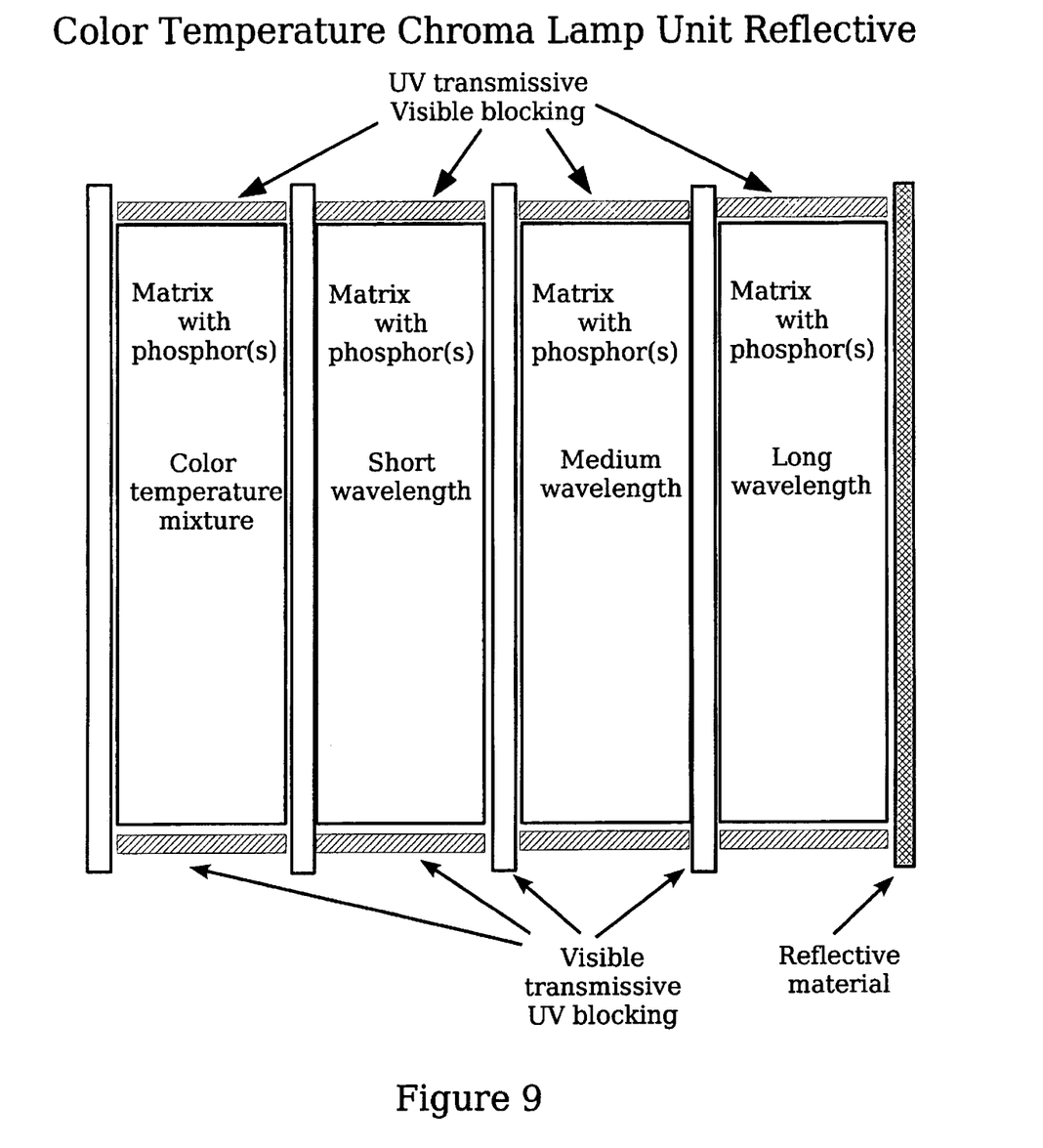
FIG. 9 is a side view of still an additional embodiment of the controllable illumination device of the present invention including four cells incorporating a color temperature mixtures as well as short, medium and long wavelength mixtures.

A new embodiment of a lamp is created when the chroma light cells (composed of narrow bandwidth phosphors) which output saturated colors are combined with the color temperature light cells (the blackbody color temperature embodiment). This version is designed for generating saturated colors, tints, and white light of varying color temperatures. Tints are defined as white light that has been combined with a saturated color. The saturated color light cells are at the back of the lamp unit and at the front of the lamp unit are the color temperature light cells. (FIG. 9)

Figure 10:
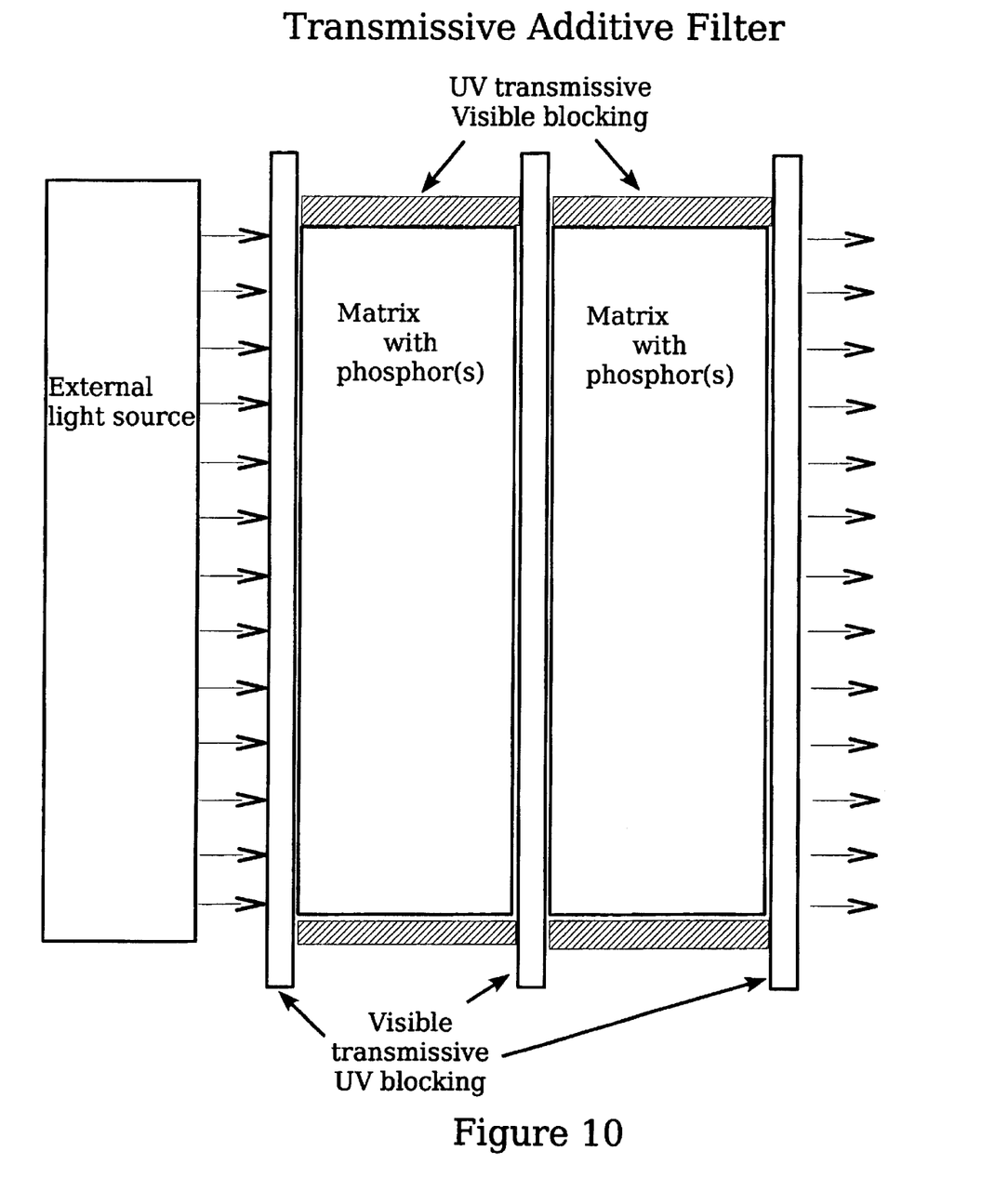
FIG. 10 is a side view of still an additional embodiment of the controllable illumination device of the present invention including two cells and an external light source.

Another advance in the state of the art is a lamp that is a lamp unit composed of: at lest one type 2 cell (transmissive filter on both sides of the light cell) and external light source coupled and directing light through the lamp unit's light cells. This embodiment is a transmissive additive filter. A transmissive additive filter is the opposite of a subtractive transmissive filter, the type of filter in common use; which removes part of that spectral power bandwidth from a wider spectral power bandwidth. An additive transmissive filter adds spectral bandwidth power. A drawback with this method is that the external light source may interact with the phosphors in the lamp cell, and cause unwanted shifts in power spectra. So if this method is used, that possible shift will have to be taken into account. The cell units can be stacked as described above giving more additive spectral power. The problem is as you increase the number of light cells, the more change for spectral shift and absorptive losses from the external light source. (FIG. 10)

For example, you could shift the color temperature of an external light source by using chroma light cells. This is accomplished by using chroma cells to add light with a corrective spectral power curve distribution to the external light source. If the color temperature is too high, it can be shifted by selectively powering up the longer wavelength "reddish" light cells. To increase the color temperature of an external light the method is basically the same except the power spectrum that has to be added is from the shorter wavelength "bluish" spectral area. This same method can be used to tune light to an external light source spectral distribution and not just color temperature correct. A problem with this embodiment is that chroma light cells must pass the full external lights bandwidth. Because of this you have to use the less efficient version of a chroma lamp unit. The only difference between the transmissive lamp and transmissive chroma cell is the aerogel phosphor mixture. (FIG. 10)

Another embodiment of a lamp can be made by using transmissive filter color temperature light cells. In this expression the color temperature lamp unit is coupled with an external light source and the sum of both spectral distributions is output from the filter lamp.

The same problem happens when you pass external light through these cells; some of the light will be lost and get absorbed and readmitted at a different wavelength. (FIG. 10)

If a power spectral density that is not smooth is needed, then external light sources that have very narrow bandwidths can be used such as lasers, or the spiky emission from the elemental discharge lamps could be coupled to transmissive light cells.

The lamp units can be operated as a single unit or can be arranged into lighting panel arrays. These panel arrays will consist of a plurality of lamp units arranged in a hexagonal (honeycomb) grid or a square/rectangular grid. Each lamp unit in a panel array will be assigned a unique identification code number or address number.

Each of the lamp units in a panel can be addressed with parameter control information. Therefore the lamp units will be emitting the spectral distributions and intensities defined by that specific command for that unit. If the installed lamp units are the same type and configured identically, then each lamp will deliver the same spectral power output and the same command or parameter control information. Therefore the panel will be evenly lit.

Since each lamp unit can be individually addressed in the panel it can be used as a display or a patterned light. If the changes are not gradual, a large change in intensity and/or spectral distribution, then the light emitted from the panel will light an area with mottled light distribution. If the changes between lamp cells are gradual then the light will give a gradually changing wash of light.

If a very large panel is assembled into a regular grid of lamps it can be used to create a very large display. Each lamp unit in this display is one pixel. If you make chroma lamp units (pixels: in this application), out of red(R), green(G), and blue(B) phosphor chroma light cells (the primaries used for motion picture and video displays), it will give you colors from within the triangle joining the set of primaries on a CIE chromaticity diagram. Using lamp units as pixels in a display, requires phosphors with different characteristics that you would use for lighting. With a display you want narrow bandwidth lamps, because they will give you the highest color saturation. A display designed like this could be used to show full motion video or still images.

Two examples of prior art with large display devices that have addressability and frame buffers and PWM control of the light units. A display that uses large RGB pixels was created with a plurality of cathode ray tubes and the teaching is embodied in U.S. Pat. No. 4,367,464, herein incorporated by reference. This patent was issued to Kurahashi in 1983, "Large scale display panel apparatus" and further teaches that these RGB CRTs are arranged into a large grid. Each CRT is addressable, and operational parameters can be stored in a digital memory. Power to each CRT is controlled by a drive circuit.

A large display used RGB lamp units made of pluralities LEDs and uses PWM powering. U.S. Pat. No. 4,720,709, herein incorporated by reference, was issued to Imamura, et al. in 1988, "Color display system utilizing a matrix arrangement of triads".

These patents clearly demonstrate how any plurality of large, fast reacting, controllable light sources can be combined into displays.

An advantage of a display composed of chroma light units is that all the color producing layers (cells) in the lamp unit are coaxial. In many of the large displays, the three primaries (R,G,B) are adjacent to each other and because of this the color blending is not very good. If a very high color rendering display is desired, it can be created from a larger set of primaries describing a larger set of color space in the CIE chromaticity diagram. For example, if you use six primaries adding violet, blue-green, and yellow, you greatly expand the color space of possible colors, thus giving a better and more true-to-life display.

This kind of display would give a heightened sense of reality because the higher color fidelity. When a panel is used for lighting, you want the best color rendering index (CRI) and this you get with "white" light. Therefore the best panel would be composed of color temperature lamp units.

Panels constructed out of lamp units could be used for decorative walls or displays that are integral to the building. An advantage of using aerogel as a material is that it is very light and a very good insulator. Panels constructed with more than three chroma cells per chroma lamp give images that vary where color is very vivid and real looking. This would be a good way of making displays for environmental simulators, especially if you made them out of six chroma cells per lamp unit. The panels would also be useful for lighting on aircraft or even spacecraft because they would be light and also good thermal protection.

It should be apparent, however, to those skilled in the art that many more modifications besides those already described are possible without departing from the inventive concepts herein. Moreover, in interpreting the disclosure and exemplary claims shown below, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced.

The invention claimed is:

1. A controllable illumination device comprising:
   a reflective first cell having,
      a first enclosure having a central cavity, said first enclosure including a visible light transmissive outlet for transmitting visible light;
      a first phosphor material positioned in said first enclosure's central cavity responsive for producing visible light upon receipt of UV rays;
      a first substantially UV light source optically connected to said first phosphor material for causing said first phosphor material to produce visible light rays;
   a transmissive second cell having,
      a second enclosure having a central cavity, said second enclosure including a first visible light inlet connected to said first cell outlet for communicating visible light produced by said first phosphor material into said second cell, said second cell further including a visible light transmissive outlet for transmitting visible light;
      a second phosphor material positioned in said second enclosure's central cavity responsive for producing visible light upon receipt of UV rays;
      a second UV light source optically connected to said second phosphor material for causing said first phosphor material to produce visible light rays; and
   a controller connected to said first and second UV light sources for independently controlling the intensity of UV rays emitted from both the first and second UV light sources.

2. The controllable illumination device of claim 1 further comprising:
   an optical filter positioned at said first visible light transmissive outlet which blocks UV rays passing from said first cell to said second cell.

3. The controllable illumination device of claim 1 wherein:
   said first enclosure further includes a first UV transmissive inlet for receiving UV light, and said first UV light source is connected to said first UV transmissive inlet for transmitting light through said first UV transmissive inlet to said first phosphoric material; and
   said second enclosure further includes a second UV transmissive inlet for receiving UV rays, and said second UV light source is connected to said second UV transmissive inlet for transmitting light through said second UV transmissive inlet to said second phosphoric material.

4. The controllable illumination device of claim 3 wherein:
   said first and second UV transmissive inlets includes an optical filter which blocks visible light passing from said UV sources into said first and second cells; and
   said first visible light transmissive outlet includes an optical filter which blocks UV rays passing from said first cell to said second cell.

5. The controllable illumination device of claim 2 wherein:
   said first visible light transmissive outlet's optical filter includes a band pass filter which blocks a portion of visible light so that said first cell transmits visible light to said second cell at a desired frequence band.

6. The controllable illumination device of claim 1 wherein:
said first cell produces visible light at a different frequence band than said second cell.

7. The controllable illumination device of claim 1 wherein:
said first phosphor material produces visible light at a different frequence band than said second phosphor material.

8. A controllable illumination device comprising:
a reflective first cell having,
   a first enclosure having a central cavity, said first enclosure including a visible light transmissive outlet for transmitting visible light;
   a first phosphor material positioned in said first enclosure's central cavity responsive for producing visible light upon receipt of UV rays;
   a first substantially UV light source optically connected to said first phosphor material for causing said first phosphoric material to produce visible light rays;
a transmissive second cell having,
   a second enclosure having a central cavity, said second enclosure including a first visible light inlet connected to said first cell outlet for communicating visible light produced by said first phosphor material into said second cell, said second cell further including a visible light transmissive outlet for transmitting visible light;
   a second phosphor material positioned in said second enclosure's central cavity responsive for producing visible light upon receipt of UV rays;
   a second UV light source optically connected to said second phosphor material for causing said first phosphoric material to produce visible light rays;
an optical filter positioned at said first visible light transmissive outlet which blocks UV rays passing from said first cell to said second cell; and
a controller connected to said first and second UV light sources for independently controlling the intensity of UV rays emitted from both the first and second UV light sources.

9. The controllable illumination device of claim 8 wherein:
optical filter positioned at said first visible light transmissive outlet incorporates a band pass filter which blocks a portion of visible light so that said first cell transmits visible light to said second cell at a desired frequence band.

10. The controllable illumination device of claim 8 wherein:
said first phosphor material produces visible light at a different frequence band than said second phosphor material.

11. A controllable illumination device comprising:
a reflective first cell having,
   a first enclosure having a central cavity, said first enclosure including a visible light transmissive outlet for transmitting visible light;
   a first phosphor material positioned in said first enclosure's central cavity responsive for producing visible light upon receipt of UV rays;
   a first substantially UV light source optically connected to said first phosphor material for causing said first phosphoric material to produce visible light rays;
a transmissive second cell having,
   a second enclosure having a central cavity, said second enclosure including a first visible light inlet connected to said first cell outlet for communicating visible light produced by said first phosphor material into said second cell, said second cell further including a visible light transmissive outlet for transmitting visible light;
   a second phosphor material positioned in said second enclosure's central cavity responsive for producing visible light upon receipt of UV rays;
   a second UV light source optically connected to said second phosphor material for causing said first phosphoric material to produce visible light rays;
a transmissive third cell having,
   a third enclosure having a central cavity, said third enclosure including a visible light inlet connected to said second cell outlet for communicating visible light produced by said first phosphor material and said second phosphor material into said third cell, said third cell further including a visible light transmissive outlet for transmitting visible light;
   a third phosphor material positioned in said third enclosure's central cavity responsive for producing visible light upon receipt of UV rays;
   a third UV light source optically connected to said third phosphor material for causing said first phosphoric material to produce visible light rays;
an optical filter positioned at said first visible light transmissive outlet which blocks UV rays passing from said first cell to said second cell;
an optical filter positioned at said second visible light transmissive outlet which blocks UV rays passing from said second cell to said third cell; and
a controller connected to said first, second and third UV light sources for independently controlling the intensity of UV light emitted from the first, second and third UV light sources.

12. The controllable illumination device of claim 11 wherein:
said optical filter positioned at said first visible light transmissive outlet incorporates a band pass filter which blocks a portion of visible light so that said first cell transmits visible light to said second cell at a desired frequence band; and
said optical filter positioned at said second visible light transmissive outlet incorporates a band pass filter which blocks a portion of visible light so that said second cell transmits visible light to said third cell at a desired frequence band.

13. The controllable illumination device of claim 12 wherein:
said optical filter positioned at said first visible light transmissive outlet blocks visible light at a narrower frequency band than said optical filter positioned at said second visible light transmissive outlet.

14. The controllable illumination device of claim 11 wherein:
said first, second and third phosphor materials produce visible light at different frequence bands.

* * * * *